(12) United States Patent
Bitticker et al.

(10) Patent No.: US 6,443,549 B1
(45) Date of Patent: Sep. 3, 2002

(54) CONTINUOUS TONE REPRODUCTION USING IMPROVED INK JET DROPLET DISPERSION TECHNIQUES

(75) Inventors: William R. Bitticker, Centerville; Michael J. Piatt, Kettering, both of OH (US)

(73) Assignee: Scitex Digital Printing, Inc., Dayton, OH (US)

( * ) Notice: Subject to any disclaimer, the term of this patent is extended or adjusted under 35 U.S.C. 154(b) by 0 days.

(21) Appl. No.: 09/497,888

(22) Filed: Feb. 4, 2000

(51) Int. Cl.[7] .............................................. B41J 2/205
(52) U.S. Cl. ....................... 347/15; 358/502; 358/521; 347/14
(58) Field of Search ............................. 347/15, 43, 42, 347/14; 358/501, 502, 517, 521, 532, 536, 538, 540, 457, 458, 459, 461, 429

(56) References Cited

U.S. PATENT DOCUMENTS

| | | | | |
|---|---|---|---|---|
| 4,272,771 A | * | 6/1981 | Furukawa | 347/43 |
| 5,729,259 A | * | 3/1998 | Gotoh et al. | 347/43 |
| 5,917,952 A | * | 6/1999 | Noh | 358/429 |

* cited by examiner

*Primary Examiner*—Lamson D. Nguyen
(74) *Attorney, Agent, or Firm*—Barbara Joan Haushalter

(57) ABSTRACT

A method for improving tone reproduction in a digital printing system is provided. First, an image to be printed is defined. The image will have areas of minimal ink density and areas of medium to high ink density. A randomized dot placement scheme is used for dispersing ink drops in the minimal ink density areas of the image. An ordered structure scheme is used for dispersing ink drops in the medium to high ink density areas of the image.

19 Claims, 4 Drawing Sheets

CONTINUOUS TONE REPRODUCTION USING IMPROVED INK JET DROPLET DISPERSION TECHNIQUES

TECHNICAL FIELD

The present invention relates to digital printing and, more particularly, to a dot dispersion technique to improve tone reproduction in an ink jet printer.

BACKGROUND ART

Ink jet printing systems are known in which a print head defines one or more rows of orifices which receive an electrically conductive recording fluid, such as for instance a water based ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

The various techniques for digital printers to provide continuous tone (monochrome or color) include ordered drop dispersion patterns, the building of dot clusters (which look similar to conventional offset halftone printing and are typically printed with very high resolution digital printers such as 1200 dpi), and stochastic (error diffusion) screening. An example of simple drop dispersion is the Bayer fill sequence, known in the art. Other examples are embedded within the Adobe program, PhotoShop. That program also includes the dot clustering technique with selectable lines/inch and optional screening angles. Error diffusion has been available for over a decade and has recently been incorporated into many of the desk top printers.

Unfortunately, many dispersion patterns produce objectionable texture or artifacts, especially in the highlights. In addition, some halftone algorithms for color printing require more accurate registration of the different color dots than is possible with web printers, resulting in unpredictable color shifts. Dot clusters (combined with screen angles) try to resolve this problem, but the graininess is very bad. Error diffusion provides the best results, but is pattern-dependent and very math-intensive; on-line rendering of images cannot keep up with the high speed printers being developed.

Fundamentally, ordered dithers (angles, Bayer, etc.) have been employed in the past to permit gray scale printing from limited bit depth imaging systems. More recently, random dithers have been developed to hide the patterning. In general, these random dithers hide repeatable artifacts as they grow in size. At a 256×256 matrix size, the patterns appear to be random to the eye. However, the quality is still not as good as error diffusion, causing images to appear fuzzy, snowy or grainy. The reason for this effect is tied to the size of the matrix. Representing a midtone in a matrix that large causes holes and dense spots inside of the random matrix. This randomization is reflected in large areas of homogenous tone and in edge definition. Error diffusion is better because it optimizes each pixel on an individual basis, so the images remain sharp and smooth. Even so, images created with error diffusion have visible image artifacts in the midtone range that range from annoying to severe.

It would be desirable then to be able to provide continuous tone reproduction, or images, using improved ink jet droplet dispersion techniques that eliminate visible image artifacts.

SUMMARY OF THE INVENTION

The present invention proposes the use of custom tuned random dithers in the highlights that transition into structured dithers in the midtone and shadow areas. This takes advantage of the benefits of random dithers while eliminating their negative effects. To accomplish this, the present invention proposes using two distinct dot placement schemes for dot dispersion. In the light areas, having little ink coverage, ink dots are dispersed pseudo-randomly in the halftone cell. In the medium to high density tones, the pseudo-random patterns can give visibly annoying artifacts, so these coverage areas apply an ordered pattern.

In accordance with one aspect of the present invention, continuous tone reproduction is provided through improved ink jet droplet dispersion techniques. In the highlights, such as the range from no dots up through a transition zone, for example, approximately 25% coverage in an ink jet system, (25% of the pixels have a dot or drop of ink), the dot placement scheme disperses ink dots pseudo-randomly in the halftone cell. Of course, in other systems, the transition zone may be at a higher or lower coverage level. Beyond the 25% range, the dot placement scheme disperses ink dots in an ordered pattern. Of course, the 25% point of cross-over is arbitrary and could be any coverage value, such as 15% or 50%, and will vary depending on the printing system being used. The purpose of the transition zone is to minimize visual artifacts between dither patterning techniques of the present invention, and the transition zone is selected to achieve this purpose. For example, within the highlight range, dots are randomly selected from only those dots used at the cross-over intensity, to assure a smooth transition from the random phase to the ordered. Beyond the highlight range, dot selection is ordered.

Other objects and advantages of the invention will be apparent from the following description, the accompanying drawings and the appended claims.

DETAILED DESCRIPTION OF THE PREFERRED EMBODIMENTS

The present invention proposes using two distinct dot placement schemes for dot dispersion. In the light areas, having little ink coverage, ink dots are dispersed in a randomized manner in the halftone cell. The randomized technique can be random or pseudo-random. If the technique is random, it may employ error diffusion. In the medium to high density tones, the randomized or pseudo-random patterns can give visibly annoying artifacts. Therefore for these coverage levels, ordered patterns are used. The patterns used for each print color, black, cyan, magenta, and yellow, are distinct from each other. This helps avoid the moire type of artifact. This also makes color of the halftone image less sensitive to the registration accuracy of the different color drops. That is, if the halftone patterns are not distinct for the different colors, visually one can perceive a change in color for a pattern printed with the different color drops lying on top of each other compared to the same halftone pattern with the different colors not lying on top of each other.

Continuous tone images are typically represented with spatial modulation of colorant that is proportional to the local density of the image to be represented. Digital images data files are represented as multi-bit values per pixel for each of a set of primary colors. Imaging devices typically can print these values directly. High resolution output devices print a variable sized dot within the pixel cell to represent the binary value of density for that specific pixel. Lower resolution devices use more than one pixel location to represent the tones scale of a specific pixel. The bit depth of a single pixel may be significantly below that of the actual multi-bit pixel data; such as 0 to 5 drops per pixel compared to 256 gray levels.

Figure 1:
FIG. 1 is an illustration printed using an error diffusion technique.

Some devices use error diffusion, such as is illustrated in FIG. 1, to accomplish the task of representing the tones scale of a specific pixel. In this method, the image density error from each printed pixel is distributed to neighboring pixels. This method has the advantage of random dot placement reducing apparent structure in the image, an unlimited number of printed gray levels, and high edge acuity. In the midtones, however, error diffusion can produce annoying artifacts. For high speed printing, the most significant problem with this type of algorithm is that it is process-intensive and difficult to implement in real time for high speed printing devices like a continuous ink jet printing press.

Figure 2:
FIG. 2 is the illustration of FIG. 1, printed using dither matrices.

Referring now to FIG. 2, dither matrices have been widely accepted as a method of printing continuous tone images with minimal bit depth low resolution output devices. When printing continuous tone images, it is advisable to produce dither patterns that are visually pleasing. In general, it has been shown that the human eye is very sensitive to repeat patterns. This is especially true in the neighborhood of a dozen pixels at 300 pixels per inch. For this reason, randomization of the dither patterns enhances overall image quality, especially in the highlight areas where the individual dot structures are most apparent. The present invention proposes one method to improve this situation, which is to store a number of unique dither patterns for each density level. These patterns can be addressed randomly or sequentially in order to avoid visual repeat of the pattern at the spacial frequency of the matrix size when printing a large area of homogenous density.

In this method, a matrix of varied ink population is stored for each tone level. Normally, 256 such matrix patterns would be provided for 256 levels of intensity, but there could be more or fewer, depending upon the printing requirements. These predefined matrices are addressed with both position and magnitude, based on the values of the digital input file to be printed. The entry within a particular intensity level matrix, as well as the position, tells the printer whether to print a dot (one or more drops) for every pixel on the page. Dither matrices have the advantage of being simple to implement and can be addressed at very high print speeds. Unfortunately, dither matrices are prone to mark the printed image with artifacts that are reminiscent of the matrix structure. Typically, each sequential tone value is represented with a dot structure that is sequentially built from previous matrices; otherwise objectionable image contouring can occur. So, increasing tone density is accomplished by printing additional matrix elements without altering the positions of the printed dots represented by the matrices of lower density. One class of ordered dithered patterns is the halftone screens. To avoid moire problems when printing multiple colors, the halftone screen for each color is rotated relative to the others.

Typically, dither patterns are used to represent tone scale in low resolution printing devices. These dither patterns represent density levels from paper white to maximum ink coverage. The patterns are stored im memory and addressed based on the value of the incoming image data. For memory considerations, these patterns tend to all be the same physical size.

The present invention proposes to reduce visually repetitive patterns in continuous tone images, printed with relatively low resolution imaging systems, by varying the period of the repeat frequency within the fixed matrix size. For example, a given level of a 16×16 matrix may be composed of four 8×8 matrices that are repeated in the larger matrix. Another density level my well be represented with a matrix size of 12×12 embedded and repeated inside of the larger 16×16 matrix. Using this technique, fixed spacial frequency repeat patterns are avoided.

Figure 3:
FIG. 3 is the illustration of FIG. 1 printed using a randomization techniques for the printed drops.

In the existing art, there has been some effort to randomize the positions of the printed drops within the matrix, as illustrated in FIG. 3.

Each level of intensity is increased by randomly adding a dot to the previous pattern structure. The result is pleasing in the highlights, but artifacts are visible in the midtones. In addition, the midtones and shadows will produce unpredictable color results when several inks are being combined. The randomized highlights are more visually pleasing than the ordered dithers. Large constant-tone areas will show the repetition of a constant value matrix. Larger matrices, typically 128×128 pixels or greater, tend to mask this effect on 300 dpi printers. The problem with matrices this large is that edge definition and detail reproduction is dramatically reduced. The overall appearance of the image is rather sandy. However, random matrices do approach the quality of error diffusion in extreme highlight areas.

Figure 4:
FIG. 4 is the illustration of FIG. 1 applying multiple dither print techniques that are optimized for the printing engine.

Referring now to FIG. 4, the present invention discloses matrices for use in continuous tone imaging, that are optimized for the printing engine. Specifically, matrices are defined for high speed continuous ink jet systems. These matrices can be addressed at the printing speed of high speed printers. In accordance with the present invention, an ordered structure scheme is used for dispersing ink drops in the medium to high density areas 12 of the image 10 of FIG. 4. Advantage is taken of known interactions between the ink and the paper to optimize the overall print quality. These dense shadow tones, indicated as areas 12, produced from multiple droplets of the primary colors in the same or adjacent pixels show little dependency on the dither pattern. This is the case as long as each and every pixel has some colorant added to it. The droplets are large enough to spread and touch the neighboring droplets to give the appearance of a solid fill area. In these regions 12, matrices are chosen that are favorable to the operation of the print engine.

In the mid-tones, indicated as regions 14, printing every couple of pixels, it is still desirable to use ordered dither patterns to maintain accurate edge definition. These ordered dither patterns are selected based on maximum spatial distribution within the matrix cell. For random patterns according to the present invention, the fill sequence of patterns from one sequence to the next do not need to be derived from prior levels; whereas the ordered patterns are typically dependent on prior levels. Random dithers, then, are those where each level is built to visually complement the adjacent tone levels but not necessarily depend upon the dot locations within those matrices. The highlights look best when printed with random dither patterns.

Ordered dithers are constructed in a building block process where each subsequent level is an addition of ink added to the dot positions of lower density tone representations. This is typically referred to as a progressive fill sequence. These are the minimal ink density areas of image 10, indicated as regions 16. The negative attributes associated with random dithers are not apparent in the extreme highlight areas. This is proven when comparing the facial region of FIG. 3 with the facial region of FIG. 4 and noting that the difference is minimal; whereas the differences between the facial region of FIG. 1 (diffusion) and FIG. 4 are very noticeable. These dithers look very similar to error diffused patterns, with the transition from the ordered pattern to the random pattern occurring at a transition density, for example between about 15% and 35%, and typically at approximately 25% for an ink jet printing system; although the transition density will vary, depending on the system in use.

Between the highlights and the midtones, the matrices are blended, applying a blended dot placement scheme, so that they gradually evolve from one style to another. This process can be done to eliminate sharp jumps in intensity from one level to the next. The result is a smooth continuous tone that takes advantage of the best attributes of each of the individual matrix techniques, while simultaneously avoiding the shortcomings of each matrix approach. The transition zone between one type of dither pattern and another is intended to gradually interpolate, so a continuous tone is achieved.

To further enhance image quality, selection of matrix structures is uniquely defined for each colorant. The interdependence between matrices for each of the primary color inks makes the image less sensitive to registration errors between the colors planes. This is accomplished by equalizing the dot-on-dot and the dot-adjacent-to-dot convolution of two matrices of similar intensity but different primary colors. By building the matrices in this way, secondary and tertiary colors, which are derived from ink droplets printed from two or more primary colors, are independent of registration between the colors. This technique is important only in the midtones. In the extreme highlights, it is desirable to assure that there are no dots of the same color on top of each other so that the ink will be equally distributed throughout the primarily white area of the paper. For low resolution printing systems, this maximum ink spreading in the highlights is most pleasing to the eye.

The shadow areas, on the other hand, are not dependent on ink distribution. However, considerations such as paper handling and paper integrity suggest that the best solution is to equally distribute the ink from one pixel to the next to avoid problems with the paper-like show-through and cockle. For example, a shadow area is better filled with a single droplet in each pixel, rather than two droplets in every other pixel. It is particularly true in printing all colors at high speed prior to drying the paper.

The hybrid dither pattern of the present invention has particular benefit in the processed colors composed of midtones or shadow densities of one color, combined with highlight densities of another color. One such example is a few random cyan droplets placed on a nearly solid yellow background. The darker cyan ink (but very few drops) is a randomized dither, and the yellow color is an ordered dither. The resulting appearance is much more pleasing to the eye than ordered dithers and better defined than full random dithers.

The invention has been described in detail with particular reference to certain preferred embodiments thereof, but it will be understood that modifications and variations can be effected within the spirit and scope of the invention.

What is claimed is:

1. A method for improving tone reproduction in a digital printing system comprising the steps of:

defining an image to be printed, the image having areas of minimal ink density and areas of medium to high ink density, with ink drops dispersed in a plurality of sequence patterns in the ink density areas;

using a randomized dot placement scheme for dispersing ink drops in the minimal ink density areas of the image; and using an ordered structure scheme for dispersing ink drops in the medium to high ink density areas of the image.

2. A method as claimed in claim 1 wherein the ordered structure scheme is dependent on prior sequence patterns.

3. A method as claimed in claim 2 wherein different ordered patterns are used for different color separations.

4. A method as claimed in claim 1 wherein the change from the ordered structure scheme to the randomized dot placement scheme is at a predetermined density coverage level.

5. A method as claimed in claim 4 wherein the change from the ordered structure scheme to the randomized dot placement scheme is at a density level of approximately 15% to 50% coverage.

6. A method as claimed in claim 1 wherein the randomized dot placement scheme is independent of prior sequence patterns.

7. A method as claimed in claim 1 further comprising a transition zone applied in areas between the randomized dot placement scheme in the minimal ink density areas of the image and the ordered structure scheme in the medium to high ink density areas of the image. of the image.

8. A method for improving tone reproduction in a digital printing system comprising the steps of:

defining an image to be printed the image having areas of minimal ink density, areas of medium ink density and areas of high ink density, with ink being dispersed in a plurality of sequence patterns to form the image;

using a first dot placement scheme for dispersing ink drops in any one or more of the ink density areas of the image; and using at least one subsequent dot placement for dispersing ink drops in any one or more of the ink density areas of the image, wherein the dot placement schemes are different for each ink.

9. A method as claimed in claim 8 wherein at least one of the first dot placement scheme and the at least one subsequent dot placement scheme comprises an ordered dot placement scheme.

10. A method as claimed in claim 9 wherein the ordered structure scheme is dependent on prior sequence patterns.

11. A method as claimed in claim 8 wherein at least one of the first dot placement scheme and the at least one subsequent dot placement scheme comprises a random dot placement scheme.

12. A method as claimed in claim 11 wherein the random dot placement scheme is independent of prior sequence patterns.

13. A method as claimed in claim 11 wherein the random dot placement scheme can vary from one ink to another.

14. A method as claimed in claim 8 wherein at least one of the first dot placement scheme and the at least one subsequent dot placement scheme comprises a Bayer dot placement scheme.

15. A method as claimed in claim 8 wherein at least one of the first dot placement scheme and the at least one subsequent dot placement scheme comprises an error diffusion dot placement scheme.

16. A method as claimed in claim 8 wherein at least one of the first dot placement scheme and the at least one subsequent dot placement scheme comprises a dither dot placement scheme.

17. A method for improving tone reproduction in a digital printing system comprising the steps of:

defining an image to be printed, the image having areas of minimal ink density, areas of medium ink density and areas of high ink density;

using a randomized dot placement scheme for dispersing ink drops in the minimal ink density areas of the image;

using an ordered structure scheme for dispersing ink drops in the high ink density areas of the image; and using a blended dot placement scheme for dispersing ink drops in the medium density areas of the image.

18. A method as claimed in claim 17 wherein the blended dot placement scheme is applied at a predetermined transition coverage level.

19. A method as claimed in claim 17 wherein the randomized dot placement scheme can vary from one ink to another.

* * * * *